United States Patent [19]

Sasaki et al.

[11] Patent Number: 4,603,168

[45] Date of Patent: Jul. 29, 1986

[54] METHOD FOR CURING ORGANOPOLYSILOXANE COMPOSITIONS AND THE COMPOSITIONS

[75] Inventors: Shosaku Sasaki; Yuji Hamada, both of Ichihara, Japan

[73] Assignee: Toray Silicone Co., Ltd., Tokyo, Japan

[21] Appl. No.: 702,532

[22] Filed: Feb. 19, 1985

[30] Foreign Application Priority Data

Feb. 21, 1984 [JP] Japan ................... 59-31265

[51] Int. Cl.[4] .......................... C08F 2/46; C08G 77/08
[52] U.S. Cl. ........................ 522/18; 522/21; 522/22; 522/28; 522/29; 522/30; 522/99
[58] Field of Search ............ 204/159.13; 522/22, 522/99, 18, 21, 28, 29, 30

[56] References Cited

U.S. PATENT DOCUMENTS 4,064,027  12/1977  Gant ............................. 204/159.13
4,530,879  7/1985   Drahnak ....................... 204/159.13

FOREIGN PATENT DOCUMENTS 13709    9/1960  Japan .
1397     3/1961  Japan .
26798    8/1971  Japan .
125123   9/1980  Japan .
1433461  4/1976  United Kingdom .

Primary Examiner—Wilbert J. Briggs, Sr.
Attorney, Agent, or Firm—Roger H. Borrousch

[57] ABSTRACT

A method of curing certain organopolysiloxane compositions by a combination of heat and exposure to ultraviolet radiation or electron beam provides the ability to use lower temperatures than heat cures alone and shorter cure times than ultraviolet radiation or electron beam alone. The organopolysiloxane compositions are addition-curable and are made up of alkenyl-containing organopolysiloxane, organohydrogensiloxane, a platinum catalyst, an addition-reaction inhibitor selected from alkynol, 3-methyl-3-pentene-1-yne, 3,5-dimethyl-3-hexene-1-yne, methylvinylsiloxane cyclics, benzotriazole, and mixtures thereof, and a photosensitizer.

20 Claims, No Drawings

METHOD FOR CURING ORGANOPOLYSILOXANE COMPOSITIONS AND THE COMPOSITIONS

BACKGROUND OF THE INVENTION

1. Field of the Invention

The present invention provides a method for curing organopolysiloxane compositions. More specifically, the present invention provides a method for curing organopolysiloxane compositions which consist of a photosensitizer and an addition-curable organopolysiloxane containing a platinum-type catalyst by heating and by exposure to ultraviolet radiation or to an electron beam.

2. Background Information

It is known in the prior art that organopolysiloxane compositions can generally be cured by heating; refer to Japanese Pat. No. 35-13709 (No. 60-13709), No. 36-1397 (No. 61-1397) and No. 46-26798 (No. 71-26798). However, all of these methods require elevated temperatures and heating for long periods of time with the resulting drawback of low productivity. On the other hand, organopolysiloxane compositions which can be cured at room temperature or low temperatures by exposure to ultraviolet radiation or an electron beam; (refer to Japanese Kokai [Laid-Open] Pat. No. 50-61386 (No. 75-61386) (United Kingdom Patent Specification No. 1,433,461, published Apr. 28, 1976), No. 50-61486 (No. 75-61486) (U.S. Pat. No. 4,064,027, issued Dec. 20, 1977), and 55-125123 (No. 80-125123) have been developed due to recent demands for increased productivity and the increasing diversity of applications. However, these compositions have certain drawbacks including one or more of the following: a strong mercaptan odor, quite poor pot stability at room temperature, slow curing rates inappropriate for practical applications, and nonuniform curing in interior sections.

Various methods were examined by the present inventors in order to eliminate the preceding drawbacks with the resulting development of a method for curing organopolysiloxane compositions, including uniform curing in interior sections, by heating and by exposure to ultraviolet radiation or an electron beam for a short period of time at low temperatures.

SUMMARY OF THE INVENTION

This invention relates to a method for curing organopolysiloxane compositions consisting essentially of heating and exposing to ultraviolet radiation or an electron beam a photosensitizer-containing organopolysiloxane composition which consists essentially of (A) 100 parts by weight of addition-curable organopolysiloxane composition which consists essentially of (1) organopolysiloxane containing at least two silicon-bonded alkenyl groups per molecule and other organic groups when present are selected from the group consisting of alkyl groups, halogenated alkyl groups, aryl groups, aralkyl groups and alkaryl groups, (2) organohydrogenpolysiloxane containing at least two organohydrogensiloxane or hydrogensiloxane units per molecule, (3) a platinum catalyst selected from the group consisting of chloroplatinic acid-vinylsiloxane coordination compound and alcohol-modified chloroplatinic acid and (4) an addition-reaction retarder selected from the group consisting of alkynol, 3-methyl-3-pentene-1-yne, 3,5-dimethyl-3-hexene-1-yne, methylvinylsiloxane cyclics, and benzotriazole, and mixtures thereof, and (B) 0.001 to 30 parts by weight photosensitizer.

This invention also relates to the compositions which can be the compositions which can be cured by this method.

DETAILED DESCRIPTION OF THE INVENTION

The addition-curable organopolysiloxane composition which contains a platinum-type catalyst and which comprises component (A) is a composition whose principal components are organopolysiloxane containing silicon-bonded alkenyl groups, organohydrogensiloxane, a platinum-type catalyst, and an addition-reaction retarder and which may contain organic solvents, extender fillers, thermal stabilizers, flame retardants, etc., as optional components.

The organopolysiloxane containing silicon-bonded alkenyl groups, (A), preferably contains at least 2 siliconbonded alkenyl groups in each molecule from the standpoint of curability. The molecular structure of this organopolysiloxane can be straight chain, branched chain, cyclic, or network and the degree of polymerization is arbitrary. Examples of the alkenyl group are vinyl, propenyl, and butenyl. The organic groups present in this organopolysiloxane other than the alkenyl groups are alkyl groups such as methyl, ethyl, propyl, butyl, and octyl; halogenated alkyl groups such as 3-chloropropyl, and 3,3,3-trifluoropropyl; aryl such as phenyl; aralkyl groups such as 2-phenylethyl and 2-phenylpropyl; and alkaryl groups such as tolyl.

Examples of the preceding organopolysiloxane are polydiorganosiloxanes such as dimethylvinylsilyl-terminated polydimethylsiloxane, dimethylallylsilyl-terminated polydimethylsiloxane, phenylmethylvinylsilyl-terminated diphenylsiloxane-dimethylsiloxane copolymer, trimethylsilyl-terminated methylvinylsiloxane-dimethylsiloxane copolymer, silanol-terminated dimethylsiloxane-methylvinylsiloxane copolymer, and dimethylvinylsilyl-terminated polymethyl(3,3,3-trifluoropropyl)siloxane; and examples of other organopolysiloxanes are polyvinylsilsesquioxane and copolymers of dimethylvinylsiloxane units and $SiO_2$ units.

The organohydrogenpolysiloxane (2) must contain organohydrogensiloxane or hydrogensiloxane units and can be composed of only organohydrogensiloxane units or hydrogensiloxane units or can contain other organosiloxane units. At least 2 organohydrogensiloxane units must be present in each molecule from the standpoint of curability. The molecular structure of the organohydrogenpolysiloxane can be straight chain, branched chain, cyclic, or network and the degree of polymerization is arbitrary.

Examples of the preceding organohydrogenpolysiloxane are dimethylhydrogensilyl-terminated dimethylsiloxane-methylhydrogensiloxane copolymer, trimethylsilyl-terminated dimethylsiloxane-methylhydrogensiloxane copolymer, dimethylphenylsilyl-terminated dimethylsiloxanemethylhydrogensiloxane copolymer, trimethylsilyl-terminated methylhydrogenpolysiloxane, and cyclic methylhydrogenpolysiloxane.

The mixing ratio of organopolysiloxane which contains silicon-bonded alkenyl to organohydrogenpolysiloxane is generally 0.1 to 10 moles silicon-bonded hydrogen in (2) per 1 mole silicon-bonded alkenyl group in (1). Curing will be inadequate when this value is less than 0.1 mole. When the above value exceeds 10 moles, hydrogen gas bubbles will be generated which adversely affects the stability. However, the above value may exceed 10 moles when a cured foamed product is to be produced The platinum-type catalysts (3) include finely divided platinum particles, finely divided platinum particles adsorbed on a carbon powder support, chloroplatinic acid, alcohol-modified chloroplatinic acid, chloroplatinic acid-olefin complexes, chloroplatinic acid-vinylsiloxane coordination compounds, platinum black, palladium, and rhodium catalysts. The quantity of platinum-type catalyst used is determined by the requirement that it can semi-cure the above organopolysiloxane composition by heating at 50° to 100° C. and is generally 1 to 1,000 ppm as platinum metal relative to the total weight of the organopolysiloxane (1).

The addition-reaction retarder (4) is an essential component which has the effect of inhibiting the reaction at room temperature in order to impart pot stability to the composition. Examples thereof are alkynyl alcohols such as 3-methyl-1-butyne-3-ol, 3,5-dimethyl-1-hexyne-3-ol, 3-methyl-1-pentyne-3-ol, and phenylbutynol; 3-methyl-3-pentene-1-yne; 3,5-dimethyl-3-hexene-1-yne; methylvinylsiloxane cyclics, and benzotriazole. These compounds can be used as reaction inhibitors singly or as mixtures of two or more compounds. The quantity of addition-reaction retarder is determined by the condition that a practical pot life be imparted to the present composition. Although the reaction-inhibiting effect will depend on molecular structure, this quantity is preferably 0.05 to 10 parts by weight per 100 parts by weight organopolysiloxane (1) and may be adjusted up or down depending on the purpose.

The photosensitizer comprising component (B) accelerates the curing reaction of the present composition upon exposure to ultraviolet radiation or an electron beam and is a known compound usually used for ultraviolet-curable resins. Examples are aromatic ketones such as acetophenone, benzophenone, trimethylsilylated benzophenone, propiophenone, 3-methylacetophenone, 4-methylacetophenone, benzoin ethyl ether, dimethylpolysiloxane in which both ends are bonded through ether linkages with benzoin, (4-isopropyl)phenyl-1-hydroxyisopropyl ketone, 4-allylacetophenone, 3-benzylacetophenone, and 4-methoxybenzophenone; amine compounds such as triphenylamine; and azo compounds such as azobisisobutyronitrile.

The preceding photosensitizer must be used at 0.001 to 30 parts by weight and preferably 0.05 to 20 parts by weight per 100 parts by weight of the platinum catalyst-containing, addition-curable organopolysiloxane composition, component (A).

In the method of the present invention, the photosensitizer-containing organopolysiloxane composition consisting of the preceding components (A) and (B) is converted into a rubbery elastomer or cured resin by heating and by exposure to ultraviolet radiation or an electron beam.

The heating conditions depend on the type of preceding organopolysiloxane, the quantity of platinum catalyst and the thickness of the coated film; however, the heating conditions are determined by the requirement that the present composition be semi-cured by the heat treatment alone. For example, the heating temperature is 50° to 100° C. and the heating time is several tens of seconds or less.

The ultraviolet-generating source is any such source known in the prior art and examples thereof are hydrogen discharge tubes, xenon discharge tubes, and low-pressure, medium-pressure, and high-pressure mercury lamps.

The electron beam source is any such source known in the prior art and examples thereof are scanning electron beam generators and curtain electron beam generators.

The conditions of exposure to the ultraviolet radiation or electron beam are arbitrary as long as exposure alone can semi-cure the present composition.

With regard to the order of treatment, ultraviolet or electron beam exposure can be executed after the heat treatment, the heat treatment can be executed after ultraviolet or electron beam exposure, or the heat treatment and ultraviolet or electron beam exposure can be executed simultaneously. However, when the composition of the present invention is dissolved or dispersed in organic solvent, it is preferably exposed to ultraviolet radiation or an electron beam after the heat treatment.

According to the method of the present invention, the composition is completely cured by a combination of heating at low temperatures for a brief period with ultraviolet or electron beam exposure for a brief period. The composition is cured at temperatures much lower than in a prior-art heat treatment alone and is cured in times much shorter than in prior-art ultraViolet or electron beam exposure alone. Process productivity is thus increased and the mild heating conditions are appropriate for applications such as in the electronic materials industry, in coating synthetic resins and in the use of release agents.

The present invention will be explained using demonstrational examples. Parts in the examples are parts by weight, % denotes wt%, and the viscosity was measured at 25° C.

EXAMPLE 1

100 parts dimethylvinylsilyl-terminated dimethylsiloxane-methylvinylsiloxane copolymer with a 1.0 Pa·s viscosity and a 2.0% vinyl group content were mixed with 8 parts trimethylsilyl-terminated methylhydrogenpolysiloxane with a 0.006 Pa·s viscosity, 0.3 part 3-methyl-1-butyne-3-ol as the addition-reaction retarder, and 2 parts benzophenone as photosensitizer and this was then combined with a vinylsiloxane-chloroplatinic acid complex (100 ppm as platinum based on the total weight) and mixed to homogeneity. The resulting composition, denoted as Sample 1, had a viscosity of 0.81 Pa·s.

To provide Comparison Example 1, a composition was produced by the same method as for Sample 1 with the exception that the benzophenone was omitted. The resulting composition had a viscosity of 0.816 Pa·s. In addition, compositions for Comparison Examples 2 and 3 were prepared by the same method as for the preceding Sample 1 by omitting the 3-methyl-1-butyne-3-ol or the platinum catalyst, respectively. The composition of Comparison Example 3 had a viscosity of 0.808 Pa·s while the composition of Comparison Example 2 gels in mixing and its viscosity could not be measured.

When the preceding compositions were allowed to stand at 25° C., Sample 1 and the compositions of Comparison Examples 1 and 3 did not exhibit an increase in viscosity over 1 day and thus were quite stable.

Sample 1 and the compositions of Comparison Examples 1 and 3 were each coated at 1.0 g/m$^2$ on polypropylene film, heated in a hot air-circulation oven at 70° C. for 5 minutes, and then immediately irradiated with a 160 W/cm high-pressure mercury lamp at a distance of 5 cm for 0.1 second. Sample 1 was completely cured while the compositions of Comparison Examples 1 and 3 were not cured. Sample 1 was not cured only by heating at 70° C. for 120 seconds or only by exposure to ultraviolet radiation under the same conditions as above.

EXAMPLE 2

100 parts dimethylvinylsilyl-terminated dimethylsiloxane-methylphenylsiloxane-methylvinylsiloxane copolymer with a 3.0 Pa·s viscosity (containing 1.8% vinyl groups and 3.0% phenyl groups) were mixed with 8 parts trimethylsilyl-terminated dimethylsiloxane-methylhydrogensiloxane copolymer with a viscosity of 0.02 Pa·s (Si-bonded H:methyl molar ratio=1:3), 0.6 part 3-methyl-3-pentene-1-yne addition-reaction retarder and 1.5 parts benzil dimethyl ketal as photosensitizer, and this was then combined with a vinylsiloxane-chloroplatinic acid complex (180 ppm as platinum based on the total weight) followed by mixing to homogeneity. The resulting composition, denoted as Sample 2, had a viscosity of 2.36 Pa·s.

Compositions for Comparison Examples 4, 5, and 6 were prepared by the same method as for the preceding Sample 2 with the respective omission of the preceding dimethylsiloxane-methylhydrogensiloxane copolymer, the benzil dimethyl ketal photosensitizer, or the vinylsiloxane-chloroplatinic acid complex. The viscosities of the samples were 2.92 Pa·s for Comparison Example 4, 2.48 Pa·s for Comparison Example 5, and 2.39 Pa·s for Comparison Example 6.

When the preceding compositions were allowed to stand at 25° C. for 1 day, they did not present an increase in viscosity and were thus stable. Sample 2 and the compositions of Comparison Examples 4, 5, and 6 were each coated at 1.5 g/m$^2$ on a polyethylene-laminated kraft paper, irradiated with a 160 W/cm high-pressure mercury lamp from a distance of 5 cm for 0.1 second and then immediately heated in a hot air-circulation oven at 80° C. for 5 seconds. Sample 2 was completely cured while the compositions for Comparison Examples 4, 5, and 6 were not cured. Sample 2 was not cured only by heating at 80° C. for 120 seconds or only by ultraviolet exposure under the above-mentioned conditions.

EXAMPLE 3

100 parts hydroxyl-terminated dimethylsiloxanemethylvinylsiloxane copolymer gum with a 1.0% vinyl group content were dissolved in 1,000 parts toluene and this was combined with 4 parts trimethylsilyl-terminated methylhydrogenpolysiloxane with a 0.02 Pa·s viscosity, 0.2 part phenylbutynol as addition-reaction retarder, and 4 parts benzoin ethyl ether as photosensitizer and this was then stirred to give a homogeneous solution.

An alcohol solution of chloroplatinic acid (60 ppm based on the total polysiloxane weight) was homogeneously dissolved in the preceding polysiloxane solution. The resulting composition, denoted as Sample 3, had a viscosity of 0.48 Pa·s Compositions for Comparison Examples 7, 8, and 9 were prepared by the same method as for the preceding Sample 3 with the respective omission of benzoin ethyl ether, the alcohol solution of chloroplatinic acid, or phenylbutynol. The preceding compositions were allowed to stand at 25° C. for 1 day. Sample 3 and the compositions of Comparison Examples 7 and 8 did not present an increase in viscosity. The composition of Comparison Example 9 underwent an increase in viscosity and completely gelled in 2 minutes after combination with the alcoholic chloroplatinic acid and the attempt to stir to homogeneity.

Sample 3 and the compositions of Comparison Examples 7 and 8 were each coated at 1.2 g/m$^2$ as solids on aluminum plates. The toluene was evaporated at room temperature and the compositions were then heated in a hot air-circulation oven at 70° C. for 5 seconds and then immediately irradiated with a 160 W/cm high-pressure mercury lamp from a distance of 5 cm for 0.07 seconds. Sample 3 was completely cured while the compositions of Comparison Examples 7 and 8 were not cured. The compositions of Comparison Examples 7 and 8 were not cured by irradiation with the mercury lamp for 5 seconds under the above conditions.

Sample 3 was not cured only by heating at 70° C. for 120 seconds or only by irradiation with ultraviolet radiation under the above conditions.

EXAMPLE 4

100 parts trimethylsilyl-terminated dimethylsiloxane-methylvinylsiloxane copolymer 10 Pa·s viscosity, 1.7% vinyl group content) were combined with 10 parts fumed silica and heated at 160° C. for 2 hours. This mixture was then dissolved in 200 parts toluene and then combined and mixed with 5 parts trimethylsilyl-terminated methylhydrogenpolysiloxane with a 0.04 Pa·s viscosity, 0.4 part 3-methyl-1-butyne-3-ol, and 4 parts benzophenone as photosensitizer to give a homogeneous solution. The resulting mixture was then combined with vinylsiloxane-chloroplatinic acid complex (180 ppm as platinum based on the entire quantity of polysiloxane) and mixed to homogeneity. The resulting composition, denoted as Sample 4, had a viscosity of 0.29 Pa·s.

For Comparison Example 10, a composition was prepared by the same method as above with the use of a trimethylsilyl-terminated polydimethylsiloxane with a 10 Pa·s viscosity instead of the dimethylsiloxane-methylvinylsiloxane copolymer used for Sample 4.

Sample 4 and the composition of Comparison Example 10 were allowed to stand at 25° C. for 2 days; however, they did not present an increase in viscosity.

These compositions were each coated at 1.1 g/m$^2$ as solids on polyester film, heated in a hot air-circulation oven at 70° C. for 5 seconds and then immediately irradiated with a 160 W/cm high-pressure mercury lamp from a distance of 5 cm for 0.1 second. Sample 4 was completely cured while the composition of Comparison Example 10 was not cured. In addition, Sample 4 was not cured only by heating at 70° C. for 120 seconds or only by ultraviolet irradiation under the above conditions.

EXAMPLE 5

100 parts dimethylvinylsilyl-terminated dimethylsiloxane-methylvinylsiloxane copolymer with a viscosity of 1.5 Pa·s and containing 2.0% vinyl groups were combined with 5 parts trimethylsilyl-terminated methylhydrogenpolysiloxane with a viscosity of 0.01 Pa·s, 0.3 part 3,5-dimethyl-1-hexyne-3-ol, and 0.5 part 4-allylacetophenone as photosensitizer and mixed to give a solution.

The resulting solution was combined with vinylsiloxane-chloroplatinic acid complex (120 ppm as platinum based on the total weight) and this was mixed to homogeneity. The resulting composition, denoted as Sample 5, had a viscosity of 1.31 Pa·s. For Comparison Example 11, a composition was prepared by the same method as used for Sample 5 with the exception that the vinylsiloxane-chloroplatinic acid complex was omitted. Sample 5 and the composition of Comparison Example 11 were both allowed to stand at 25° C. for 2 days; however, they did not exhibit an increase in viscosity. These compositions were each coated at 0.8 g/m² on polyester film, heated in a hot air-circulation oven at 70° C. for 4 seconds and then immediately irradiated with a 1 Mrad electron beam dose from a curtain electron beam generator. Sample 5 was completely cured while the composition of Comparison Example 11 was not completely cured. In addition, the cured product of Sample 5 did not have an undesirable odor.

That which is claimed is:

1. A method for curing organopolysiloxane compositions consisting essentially of heating and exposing to ultraviolet radiation of an electron beam a photosensitizer-containing organopolysiloxane composition which consists essentially of
(A) 100 parts by weight of addition-curable organopolysiloxane composition which consists essentially of
  (1) organopolysiloxane containing at least two silicon-bonded alkenyl groups per molecule and other organic groups when present are selected from the group consisting of alkyl groups, halogenated alkyl groups, aryl groups, aralkyl groups, and alkaryl groups,
  (2) organohydrogenpolysiloxane containing at least two organohydrogensiloxane or hydrogensiloxane units per molecule,
  (3) a platinum catalyst selected from the group consisting of chloroplatinic acid-vinyl-siloxane coordination compound and alcohol-modified chloroplatinic acid,
  (4) an addition-reaction retarder selected from the group consisting of alkynol, 3-methyl-3-pentene-1-yne, 3,5-dimethyl-3-hexene-1-yne, methylvinylsiloxane cyclics, benzotriazole, and mixtures thereof, and
(B) 0.001 to 30 parts by weight photosensitizer.

2. The method according to claim 1 in which (1) and (2) are present in amounts sufficient to provide from 0.1 to 10 moles of organohydrogensiloxane and hydrogensiloxane units in (2) per one mole of alkenyl group in (1).

3. The method according to claim 1 in which (3) the platinum catalyst is present in an amount of from 0.1 to 1000 parts by weight per million parts by weight of platinum element.

4. The method according to claim 1 in which (4) is present in an amount of from 0.05 to 10 parts by weight per 100 parts by weight of (1).

5. The method according to claim 1 in which (B) is present in an amount of from 0.05 to 20 parts by weight.

6. The method according to claim 2 in which (1) is a polydiorganosiloxane consisting essentially of diorganosiloxane units selected from the group consisting of dimethylsiloxane units, methylphenylsiloxane units, methylvinylsiloxane units, and mixtures thereof, said polydiorganosiloxane is endblocked with dimethylvinylsiloxy units, trimethylsiloxy units, or silicon-bonded hydroxyl groups, and has a vinyl content of from 0.5 to 3 weight percent; (2) is a trimethylsiloxy endblocked polysiloxane containing methylhydrogensiloxane units and optionally dimethylsiloxane units, has a viscosity of from 0.005 to 0.05 Pa·s at 25° C., and is present in an amount of from 2 to 10 parts by weight based on 100 parts by weight of (1); (3) is present in an amount of from 50 to 200 parts by weight of platinum element per million parts by weight of (1); (4) is an alkynol or 3-methyl-3-pentene-1-yne and is present in an amount of from 0.1 to 1.0 part by weight per 100 parts by weight of (1); and (B) is a photosensitizer selected from the group consisting of 4-allylacetophenone, benzophenone, benzoin ethyl ether, and benzil dimethyl ketal, and is present in an amount of from 0.1 to 5 parts by weight per 100 parts by weight of (A).

7. The method according to claim 6 in which (4) is an alkynol.

8. The method according to claim 7 in which the alkynol is 3-methyl-1-butyne-3-ol.

9. The method according to claim 7 in which the alkynol is phenylbutynol.

10. The method according to claim 7 in which the alkynol is 3,5-dimethyl-1-hexyne-3-ol.

11. The method according to claim 6 in which (4) is 3-methyl-3-pentene-1-yne.

12. A method for curing organopolysiloxane compositions comprising a combination of heating and exposing to ultraviolet radiation or an electron beam a photosensitizer-containing organopolysiloxane composition which consists essentially of
(A) 100 parts by weight of addition-curable organopolysiloxane composition which consists essentially of
  (1) organopolysiloxane containing at least two silicon-bonded alkenyl groups per molecule and other organic groups when present are selected from the group consisting of alkyl groups, halogenated alkyl groups, aryl groups, aralkyl groups, and alkaryl groups,
  (2) organohydrogenpolysiloxane containing at least two organohydrogensiloxane or hydrogensiloxane units per molecule,
  (3) a platinum catalyst selected from the group consisting of chloroplatinic acid-vinylsiloxane coordination compound and alcohol-modified chloroplatinic acid,
  (4) an addition-reaction retarder selected from the group consisting of alkynol, 3-methyl-3-pentene-1-yne, 3,5-dimethyl-3-hexene-1-yne, methylvinylsiloxane cyclics, benzotriazole, and mixtures thereof, and
(B) 0.001 to 30 parts by weight photosensitizer.

13. A method for curing organopolysiloxane compositions consisting of a combination of heating and exposing to ultraviolet radiation or an electron beam a photosensitizer-containing organopolysiloxane composition which consists essentially of
(A) 100 parts by weight of addition-curable organopolysiloxane composition which consists essentially of (1) organopolysiloxane containing at least two silicon-bonded alkenyl groups per molecule and other organic groups when present are selected from the group consisting of alkyl groups, halogenated alkyl groups, aryl groups, aralkyl groups, and alkaryl groups,
  (2) organohydrogenpolysiloxane containing at least two organohydrogensiloxane or hydrogensiloxane units per molecule,
  (3) a platinum catalyst selected from the group consisting of chloroplatinic acid-vinylsiloxane coordination compound and alcohol-modified chloroplatinic acid, (4) an addition-reaction retarder selected from the group consisting of alkynol, 3-methyl-3-pentene-1-yne, 3,5-dimethyl-3-hexene-1-yne, methylvinylsiloxane cyclics, benzotriazole, and mixtures thereof, and (B) 0.001 to 30 parts by weight photosensitzer.

14. The method according to claim 1 in which the heating is at a temperature of from 50° to 100° C.

15. A composition consisting essentially of (A) 100 parts by weight of addition-curable organopolysiloxane composition which consists essentially of (1) organopolysiloxane containing at least two silicon-bonded alkenyl groups per molecule and other organic groups when present are selected from the group consisting of alkyl groups, halogenated alkyl groups, aryl groups, aralkyl groups, and alkaryl groups, (2) organohydrogenpolysiloxane containing at least two organohydrogensiloxane or hydrogensiloxane units per molecule, (3) a platinum catalyst selected from the group consisting of chloroplatinic acid-vinylsiloxane coordination compound and alcohol-modified chloroplatinic acid, and (4) an addition-reaction retarder selected from the group consisting of alkynol, 3-methyl-3-pentene-1-yne, 3,5-dimethyl-3-hexene-1-yne, methylvinylsiloxane cyclics, benzotriazole, and mixtures thereof, and (B) 0.001 to 30 parts by weight photosensitizer.

16. The composition according to claim 15 in which (1) and (2) are present in amounts sufficient to provide from 0.1 to 10 moles of organohydrogensiloxanes and hydrogensiloxane units in (2) per one mole of alkenyl group in (1).

17. The composition according to claim 16 in which (1) is a polydiorganosiloxane consisting essentially of diorganosiloxane units selected from the group consisting of dimethylsiloxane units, methylphenylsiloxane units, methylvinylsiloxane units, and mixtures thereof, said polydiorganosiloxane is endblocked with dimethylvinylsiloxy units, trimethylsiloxy units, or silicon-bonded hydroxyl groups, and has a vinyl content of from 0.5 to 3 weight percent; (2) is a trimethylsiloxy endblocked polysiloxane containing methylhydrogensiloxane units and optionally dimethylsiloxane units, has a viscosity of from 0.005 to 0.05 Pa·s at 25° C., and is present in an amount of from 2 to 10 parts by weight based on 100 parts by weight of (1); (3) is present in an amount of from 50 to 200 parts by weight platinum element per million parts by weight of (1); (4) is an alkynol or 3-methyl-3-pentene-1-yne and is present in an amount of from 0.1 to 1.0 part by weight per 100 parts by weight of (1); and (B) is a photosensitizer selected from the group consisting of 4-allylacetophenone, benzophenone, benzoin ethyl ether, and benzil dimethyl ketal, and is present in an amount of from 0.1 to 5 parts by weight per 100 parts by weight of (A).

18. The composition according to claim 17 in which (4) is an alkynol.

19. The method in accordance with claim 1 in which the composition is cured by heating and ultraviolet radiation.

20. The method in accordance with claim 1 in which the composition is cured by heating and electron beam.

* * * * *

UNITED STATES PATENT AND TRADEMARK OFFICE
CERTIFICATE OF CORRECTION

PATENT NO. : 4,603,168

DATED : July 29, 1986

INVENTOR(S) : Shosaku Sasaki and Yuji Hamada

It is certified that error appears in the above-identified patent and that said Letters Patent is hereby corrected as shown below:

Column 3, Line 3: "is to be produced" should read "is to be produced."

Column 4, Line 26: "than in prior-art ultraViolet" should read "than in prior-art ultraviolet"

Claim 1, Column 7, Line 21: "ultraviolet radiation of an electron" should read "ultraviolet radiation or an electron"

Claim 13, Column 9, Line 8: "(B) 0.001 to 30 parts by weight photosensitzer." should read (B) 0.001 to 30 parts by weight photosensitizer."

Signed and Sealed this

Thirty-first Day of March, 1987

Attest:

DONALD J. QUIGG

Attesting Officer    Commissioner of Patents and Trademarks